United States Patent [19]

Chiba

[11] Patent Number: 5,749,274
[45] Date of Patent: May 12, 1998

[54] CYLINDRICAL MEMBER AND METHOD OF MANUFACTURING THE SAME

[75] Inventor: Hiroshi Chiba, Ebina, Japan

[73] Assignee: Canon Kabushiki Kaisha, Tokyo, Japan

[21] Appl. No.: 663,362

[22] Filed: Jun. 13, 1996

[30] Foreign Application Priority Data

Jun. 21, 1995 [JP] Japan ................................ 7-178260
May 15, 1996 [JP] Japan ................................ 8-145155

[51] Int. Cl.$^6$ ................................................. B23B 1/00
[52] U.S. Cl. ............................. 82/1.11; 82/131; 82/113
[58] Field of Search ........................... 82/1.11, 113, 130, 82/131, 162, 170; 408/203.5; 409/199

[56] References Cited

U.S. PATENT DOCUMENTS

| | | | |
|---|---|---|---|
| 303,897 | 8/1884 | Thomas | 82/130 |
| 1,925,177 | 9/1933 | Delf | 82/131 |
| 2,691,921 | 10/1954 | Burgmuller | 82/130 |
| 4,055,094 | 10/1977 | Menke | 82/1.11 |
| 4,647,261 | 3/1987 | Schaffner | 82/1.11 |
| 4,819,525 | 4/1989 | Rabe | 82/113 |
| 5,003,851 | 4/1991 | Kawada et al. | 82/1.11 |

FOREIGN PATENT DOCUMENTS

| | | | |
|---|---|---|---|
| 2110570 | 4/1990 | Japan . | |
| 1489 | 7/1858 | United Kingdom | 82/130 |

*Primary Examiner*—Daniel W. Howell
*Assistant Examiner*—Mark Williams
*Attorney, Agent, or Firm*—Fitzpatrick, Cella, Harper & Scinto

[57] ABSTRACT

A cylindrical member used as an electrophotographic photosensitive drum or a developing sleeve has a cylindrical surface with a high shape accuracy (straightness and roundness). In cutting the outer circumferential surface of a cylindrical work by cutting tools rotating around the work, clamp portions of a right work holder and a left work holder are inserted into the two ends of the work. The work is held by abutting these tapered surfaces against circular ridge portions formed in the inner edges of end faces of the work and pressing the work in the axial direction.

3 Claims, 12 Drawing Sheets

$\theta_1 = (\theta_2 - 30)$ TO $60°$ $\theta_2 = 60$ TO $120°$

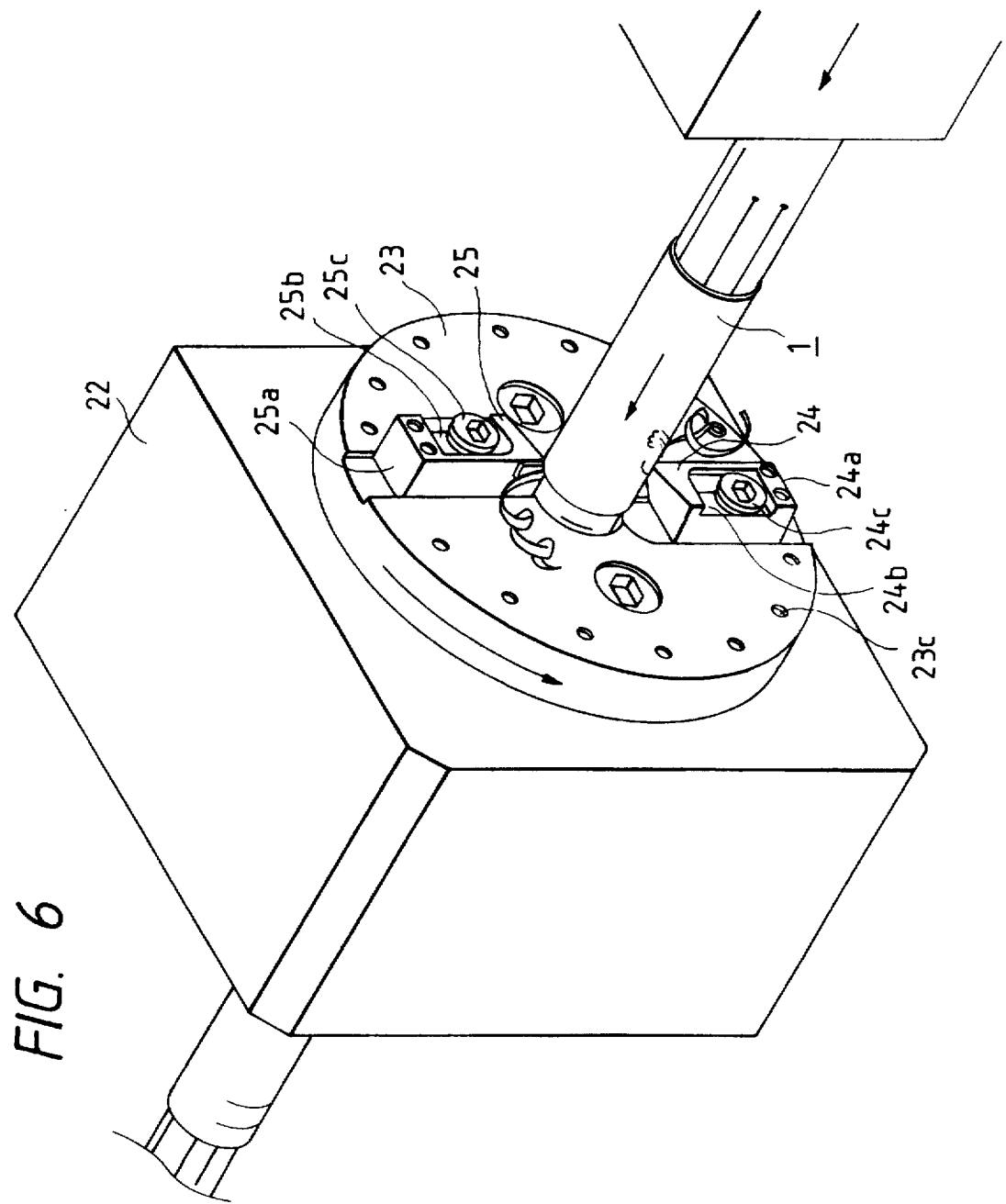

CYLINDRICAL MEMBER AND METHOD OF MANUFACTURING THE SAME

BACKGROUND OF THE INVENTION

1. Field of the Invention

The present invention relates to a cylindrical member such as an electrophotographic photosensitive drum or a developing sleeve used in an image forming apparatus, e.g., an electrophotographic copying machine, a laser beam printer, a facsimile machine, and a printing machine, and a method and apparatus for manufacturing the same.

2. Related Background Art

Conventionally, a cylindrical member whose surface is finished to have a predetermined surface roughness is used as an electrophotographic photosensitive drum or a developing sleeve for use in an image forming apparatus, e.g., an electrophotographic copying machine, a laser beam printer, a facsimile machine, and a printing machine. This electrophotographic photosensitive drum is manufactured by forming a photosensitive film on the surface of a drum base finished to have a predetermined surface roughness. If the surface accuracy or the dimensional accuracy of the drum base is low, irregularities are formed on the photosensitive film, and this produces defects in images formed by the image forming apparatus. To obtain an accurate image forming apparatus, therefore, the drum base is required to be processed to have a high surface accuracy, i.e., a predetermined surface roughness. Also, the dimensional accuracy including, e.g., a straightness and a roundness, must be extremely high.

In order to develop a latent image formed on a latent image carrier, a developing sleeve carries and conveys a developing material to the latent image carrier on which a latent image is formed by electrophotography or electrostatic recording. To carry a developing agent and faithfully visualize a latent image regardless of whether the developing agent is a single- or two-component developing agent, a magnetic or nonmagnetic developing agent, or an insulating or dielectric developing agent, the developing sleeve must have a high accuracy in, e.g., the surface roughness, the straightness, and the roundness.

Generally, as the material of a cylindrical member such as a photosensitive drum base or a developing sleeve, it is possible to use Al with a purity of 99.5% or more, a Cu—Al alloy containing 0.05 to 0.20% of Cu, a Cu—Mn—Al alloy containing 0.05 to 0.20% of Cu and 1.0 to 1.5% of Mn, a Si—Mg—Al alloy containing 0.20 to 0.60% of Si and 0.45 to 0.90% of Mg, or the like.

The following two methods are developed as the method of manufacturing such cylindrical member. In one method, a tubular material with a high surface accuracy and a high dimensional accuracy is formed by performing extrusion, drawing, and correction of a bend with a high accuracy and cut into a desired length, and the both end portions of the cut tube are cut. The other method (Japanese Patent Application Laid-Open No. 2-110570 (U.S. Pat. No. 5,003,851)) is shown in FIGS. 11A to 11C. As in FIG. 11A, a tubular work 101 is manufactured by forming a tubular material by extrusion and drawing and cutting the tubular material into a desired length. Subsequently, as shown in FIG. 11B, the both end portions of the work 101 are cut to form large inner diameter portions 101c and 101d adjacent to both end faces 101a and 101b, respectively. Each of the large inner diameter portions 110c and 101d is held by, e.g., a collet chuck 120 as shown in FIG. 11C, and the outer circumferential surface is cut by a cutting tool to obtain a cylindrical surface having a predetermined surface roughness.

The collet chuck 120 has a structure in which a chuck portion 121a of a cylindrical main body 121 can be resiliently enlarged in the radial direction by a slit 121b. That is, the chuck portion 121a of the main body 121 is inserted into the large inner diameter portion 101c (101d) of the work 101, and a draw bar 123 which biases a tapered piece 122 in the main body 121 in the axial direction against the biasing force of a spring 122a is drawn. Consequently, the tapered surface of the tapered piece 122 is pressed against the inner surface of the chuck portion 121a by the biasing force of the spring 122a. The chuck portion 121a is resiliently enlarged outward in the radial direction and pressed against the inner wall of the large inner diameter portion 101c (101d) of the work 101.

Of the above two methods, the former method in which a tubular material with a high surface accuracy and a high dimensional accuracy is formed by extrusion, drawing, and correction of a bend and cut into a desired length and the both ends of the cut tube are cut requires a high-accuracy control in the step of correction of bending. Therefore, the method is impractical because the manufacturing cost of the tubular material itself is high. Accordingly, the use of the latter method is desirable in which a low-cost tubular material formed by extrusion and drawing is cut into a work with a desired length, large inner diameter portions are formed by cutting the two end portions of the work, each large inner diameter portion is held by a collet chuck, and the outer circumferential surface of the work is cut to obtain a cylindrical surface with a high shape accuracy (surface accuracy, roundness, and straightness).

In the above prior art, however, in the step of finishing the cylindrical surface of the work, the work is held by inserting the chuck portion of the collet chuck into the work and enlarging the chuck portion in the radial direction to press the chuck portion against the inner circumferential surface of the large inner diameter portion of the work. In this state, the cylindrical surface of the work is cut by a cutting tool of a lathe. Alternatively, the work is fixed and the cylindrical surface of the work is cut by a cutting tool rotating around the work. Therefore, if the large inner diameter portion has a nonuniform wall thickness, if dust adheres to the chuck portion of the collet chuck, if the chuck portion wears, or if an assembly error is present between the collet chuck and its driving unit, the work held by the collet chuck is bent, and this makes it difficult to finish the cylindrical surface of the work with a high accuracy.

That is, to process the cylindrical surface of the work so that the surface has a high roundness and a high straightness, the work being cut must be held straight so as to be coaxial with a predetermined axis. However, a photosensitive drum or a developing sleeve is a cylindrical member having a small diameter, long in the axial direction, and thin, and hence tends to bend very easily. For example, as illustrated in FIGS. 12A to 12C, if even a slight inclination (angle) α is produced between collet chucks 131 and 132 for holding the both ends of a work 102 due to an assembly error between these chucks, a bend B is formed in the work 102 as in FIG. 12A.

As an example, a small developing sleeve for printing A4-size sheets has an overall length of 246 mm, a diameter of 12 mm, and a thickness of 0.8 mm. If an inclination of 0.01° occurs between the collet chucks 131 and 132, deformation caused by a bend of the work 102 reaches 30 μm, and the straightness decreases accordingly.

If the cylindrical surface of the work 102 in this state is cut by a cutting tool A as shown in FIG. 12B, the thickness to be cut is largely deviated in the bend B of the work 102. As shown in FIG. 12C, the work 102 returns to its initial shape when it is released from the collet chucks 131 and 132 after being cut. As a consequence, large irregularity C appear on the cylindrical surface of the work 102 to impair the straightness and the roundness of the surface.

The work 102 is bent as described above if the chuck portions of the collet chucks 131 and 132 are contaminated by dust or if a dimensional change occurs due to wear. This similarly occurs if the work 102 has a nonuniform wall thickness.

To minimize the assembly error of the collet chucks, the parts accuracy of the collet chucks must be increased, and this results in an expensive cutting apparatus. Also, the maintenance cost is raised since it is necessary to constantly monitor contamination and wear of the collet chucks. Furthermore, the large inner diameter portions of the work must be precisely finished so that the work has a uniform wall thickness, resulting in a high manufacturing cost of the work. All these problems are left unsolved and lead to an increase in the cost of the cylindrical member.

Another method is developed in which, instead of holding the two ends of the work by collet chucks, only one end of the work is held by a collet chuck, a jig having a center hole is attached to the other end of the work, and a tapered member, e.g., a rotating center of a tailstock of a lathe is pressed against the center hole of the jig. However, the above troubles cannot be avoided if a collet chuck is used for even one end of the work. Also, the method is analogous to the above methods in that the jig requires a high shape accuracy and a high assembly accuracy. Accordingly, no satisfactory result can be obtained by this method.

SUMMARY OF THE INVENTION

The present invention has been made in consideration of the unsolved problems of the above prior art, and has as its object to provide a cylindrical member which has a cylindrical surface with a very high shape accuracy and can greatly reduce the manufacturing cost of a work because the installation cost and the maintenance cost of a cutting apparatus for finishing the cylindrical surface of the work are low, and a method and apparatus for manufacturing the cylindrical member.

To achieve the above object, a cylindrical member according to the present invention comprises a cylindrical surface with a predetermined shape accuracy formed by manufacturing a cylindrical work having a circumferential ridge portion in at least one end portion of the work, holding the work by pressing the clamp surface of work holding means against the ridge portion of the work in the axial direction, and cutting the outer circumferential surface of the work.

A method of manufacturing a cylindrical member according to the present invention comprises the steps of manufacturing a cylindrical work having a circumferential ridge portion in at least one end portion of the work, holding the work by pressing the clamp surface of work holding means against the ridge portion of the work in the axial direction, and cutting the outer circumferential surface of the work.

The clamp surface of the work holding means is preferably a tapered surface.

An apparatus for manufacturing a cylindrical member according to the present invention comprises work holding means for holding a cylindrical work along a predetermined axis, and cutting means for cutting the outer circumferential surface of the work by using a cutting tool which rotates around the predetermined axis, wherein the work holding means has a clamp surface which is pressed against a circumferential ridge portion formed in at least one end portion of the work.

The work holding means preferably includes a chuck portion which can chuck the work by a pressing force in the radial direction.

The cylindrical work is held along the predetermined axis by the pressing force in the axial direction which is produced by pressing the clamp surface of the work holding means against the circumferential ridge portion of the work. The outer circumferential surface of the work is cut to have a predetermined surface roughness by the cutting tool which rotates around the work.

To allow the cylindrical surface to have high shape accuracy (roundness and straightness), it is essential to stably hold the work coaxially with the predetermined axis. If dust exists between the work holding means and the work, the work is bent and this may degrade the roundness or the straightness of the cylindrical surface. However, since the contact area between the clamp surface of the work holding means and the ridge portion is very small, it is very unlikely that dust is sandwiched between them. This makes it unnecessary to precisely monitor contamination on the clamp surface. Also, the manufacturing cost of the work is low because only the ridge portion of the work must be processed with high accuracy.

That is, the maintenance cost of the work holding means and the manufacturing cost of the work are reduced, and this greatly reduces the manufacturing cost of the cylindrical member such as a developing sleeve.

If the ridge portion is formed coaxially with the central axis of the work, the work can be accurately positioned and held along a predetermined axis only by setting the clamp surface of the work holding means coaxially with the predetermined axis. Unlike a collet chuck which holds the work by a pressing force in the radial direction, it is unnecessary to precisely control the assembly error of the work holding means, and so the installation cost of the cutting apparatus can be greatly decreased. Consequently, the manufacturing cost of the cylindrical member such as a developing sleeve can be further decreased.

Also, if the work holding means has a chuck portion capable of chucking the work by a pressing force in the radial direction, it is possible to avoid, e.g., removal of the work when the work is attached to or detached from the cutting apparatus.

BRIEF DESCRIPTION OF THE DRAWINGS

FIGS. 1A and 1B are views for explaining a method of manufacturing a cylindrical member according to an embodiment of the present invention, in which FIG. 1A is a sectional view showing a work and FIG. 1B is an elevation showing a cutting apparatus;

FIGS. 2A and 2B are views for explaining one modification, in which FIG. 2B is an enlarged view of a tapered portion in FIG. 2A;

FIGS. 3A and 3B are views for explaining another modification, in which FIG. 3B is an enlarged view of the tapered portion in FIG. 2A;

FIG. 6 is a perspective view showing the state in which the work is cut by the cutting apparatus in FIGS. 1A and 1B;

FIGS. 8A and 8B are views for explaining a case where the work is cut by a lathe, in which FIG. 8A is an elevation showing the lathe and FIG. 8B is a partial sectional view showing only a right work holder;

DETAILED DESCRIPTION OF THE PREFERRED EMBODIMENT

An embodiment of the present invention will be described below with reference to the accompanying drawings.

Figure 1A:
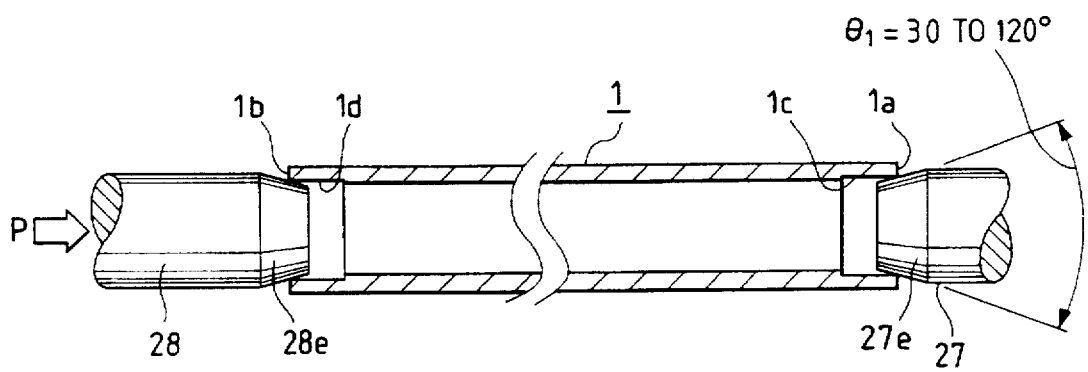
Figure 1B:
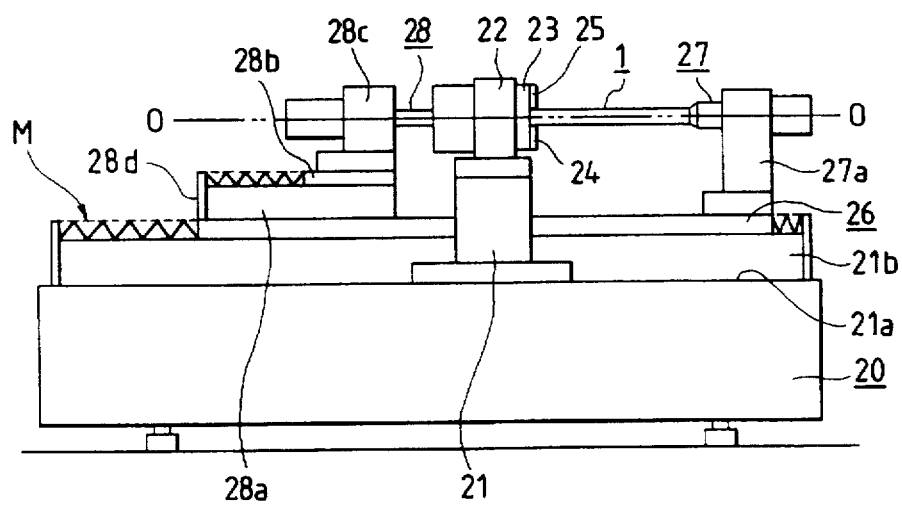

FIGS. 1A and 1B are views for explaining a method of manufacturing a cylindrical member according to the embodiment. As shown in FIG. 1A, a tubular material formed of an aluminum alloy and manufactured by well-known extrusion and drawing is cut into a predetermined length, and the inner surfaces of end portions adjacent to end faces 1a and 1b of the cut tubular material (to be referred to as a "work" hereinafter) are cut to form large inner diameter portions 1c and 1d. The outer circumferential surface of the work 1 is cut by a cutting apparatus M in FIG. 1B, thereby manufacturing a developing sleeve as an electrophotographic cylindrical member with a surface roughness of Rmax≦2 μm. The cutting apparatus M comprises a gate column 21, an annular tool holder (cutting tool holder) 23, cutting tools 24 and 25 held by the tool holder 23, a table 26, a right work holder 27, and a left work holder 28. The gate column 21 is fixed on an upper surface 21a of a bed 20 fixed to, e.g., the floor. The tool holder 23 is integrated with a hollow shaft which is rotatably supported by a bearing 22 held by the gate column 21. The table 26 is slidably supported on a table support 21b integrated with the bed 20. The right work holder 27 is formed of carbide or iron and fixed to a right post 27a on the upper surface on the right side in FIG. 1B of the table 26. The left work holder 28 is fixed to a left post 28c which is supported, via a slider support 28a and a slider 28b, on the upper surface on the left side in FIG. 1B of the table 26. The slider 28b is slidably supported on the upper surface of the slider support 28a and reciprocated between the left and the right ends in FIG. 1B of the slider support 28a. Consequently, the left work holder 28 is moved back and forth with respect to the right work holder 27.

The right work holder 27 and the left work holder 28 have tapered clamp portions 27e and 28e, respectively, and together constitute a work holding means. When these clamp portions 27e and 28e are inserted into the large inner diameter portions 1c and 1d of the work 1, a tapered surface such as the clamp surface of the clamp portion 27e of the right work holder 27 is abutted from the right side against a circular ridge portion such as the circumferential ridge portion between the end face 1a and the large inner diameter portion 1c on the right side of the work 1, where the end face 1a and the large inner diameter portion 1c cross each other. Similarly, a tapered surface such as the clamp surface of the clamp portion 28e of the left work holder 28 is abutted from the left side against a circular ridge portion such as the circumferential ridge portion between the end face 1b and the large inner diameter portion 1d on the left side of the work 1.

The clamp portion 27e of the right work holder 27 is abutted against the circular ridge portion between the end face 1a and the large inner diameter portion 1c on the right side of the work 1, and a slider driver 28d is driven to move the left work holder 28 toward the right work holder 27, thereby pressing the clamp portion 28a of the left work holder 28 against the circular ridge portion between the end face 1b and the large inner diameter portion 1d on the left side of the work 1. Consequently, the work 1 is held between the right work holder 27 and the left work holder 28 by a pressing force P in the axial direction. With the work 1 held in this way, the cylindrical surface of the work 1 is cut by the cutting tools 24 and 25 rotating around the work 1.

When the cutting tools 24 and 25 rotate around the work 1, it is necessary to prevent the work 1 from rotating together with these tools, i.e., to prevent a so-called free-running, in order to stably hold the work 1. For this purpose, the moment of a clamp force Fp of each of the right work holder 27 and the left work holder 28 generated by the pressing force P must be larger than the moment generated by a cutting force (back component force) Fn of the cutting tools 24 and 25 and acting in the circumferential direction of the work 1. That is, $$Fn \times r_1 < Fp \times r_2 \tag{1}$$

where $r_1$: the radius of the cylindrical surface of the work 1

$r_2$: the radius of the circular ridge portion between the end face 1a (1b) and the large inner diameter portion 1c (1d) of the work 1

Also, $$Fp = \mu \times P \tag{2}$$

where

μ: the coefficient of static friction between the work 1 and the tapered surface of the right work holder 27 or the left work holder 28

From expressions (1) and (2), $$Fn \times r_1 < \mu \times P \times r_2 \tag{3}$$

If the wall of the work is thin, an approximation of $r_1 \equiv r_2$ is possible. Therefore, it is preferable to control the pressing force P and the cutting force F such that the following relation is established instead of expression (3):

$$P > Fn/\mu \tag{4}$$

where Fn is the force determined by the cutting conditions, i.e., the type of work material, the amount of cut, the feed speed, and the relative rotation speed between the work and the cutting tool. For example, when a work made from A6063 (JIS: 0.20 to 0.6% Si, 0.35% Fe, 0.10% Mn, 0.45 to 0.9% Mg, 0.10% Cr, 0.10% Zn, and the remainder Al) and having an outer diameter of 20 mm was cut by a cut amount of 50 μm at a feed speed of 5 mm/s and a relative rotation speed of 3,000 rpm by using a diamond tool, it was found that Fn≡0.5 kgf. Assuming the wall of the work is thin compared to its outer diameter and the coefficient of static friction is 0.3, the pressing force P is obtained by the following relation by substituting the above value into expression (4):

$$P > 1.67 \text{ kgf}$$

Since Fn can vary in accordance with the discharge condition of chips and the supply condition of a cutting oil, an actual pressing force P is set to have a safety margin several times larger than the necessary pressing force. As an example, the value obtained by multiplying the minimum value of the pressing force P which satisfies expression (4) by a safety coefficient of 2 to 10 is used. Caution should be exercised when setting the pressing force P, because the circular ridge portion of the work plastically deforms if the pressing force P is too large.

Safety coefficients are chosen on the basis of the dimensions of the work. It is found by experiments that good results were obtained for four samples A to D manufactured by changing the work dimensions under the cutting conditions described above, when safety coefficients were chosen as shown in Table 1 below.

TABLE 1

| Sample | A | B | C | D |
|---|---|---|---|---|
| Work dimensions (mm) (diameter:length: thickness) | 12:246: 0.8 | 16:248: 0.8 | 20:331: 0.8 | 20:331: 2.0 |
| Safety coefficient | 2.4 | 6 | 6 | 9 |
| Pressing force (kg) | 4.0 | 10.0 | 10.0 | 15.0 |

The pressing force P is small in the sample A because the work plastically deforms easily due to its small outer diameter. Therefore, the outer diameter deflects and significantly decreases the accuracy if the pressing force P is increased to about 10 kg as in the case of other samples.

In the sample D, the pressing force P can be increased because the work has a large thickness and hence does not plastically deform easily.

Figure 2A:
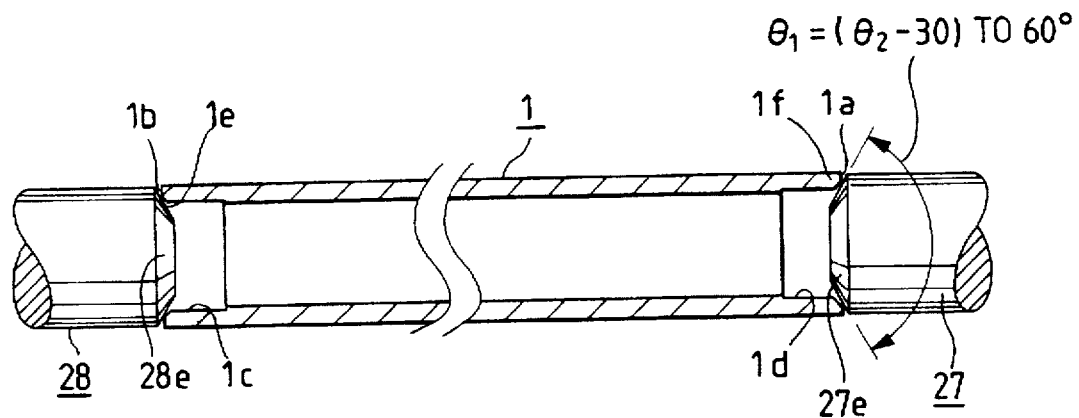
Figure 2B:
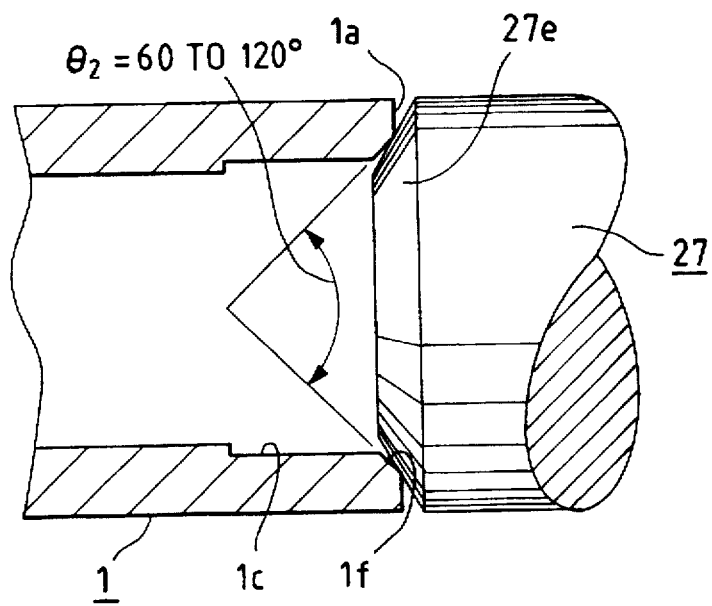
Figure 3A:
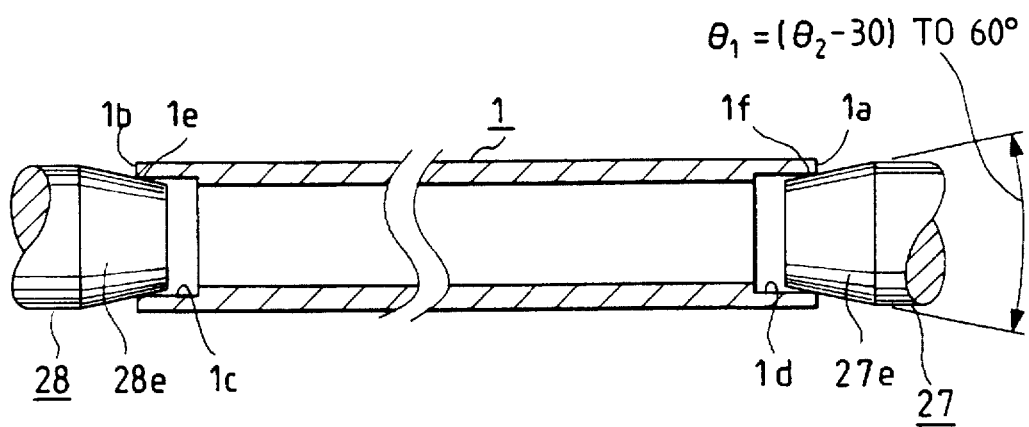
Figure 3B:
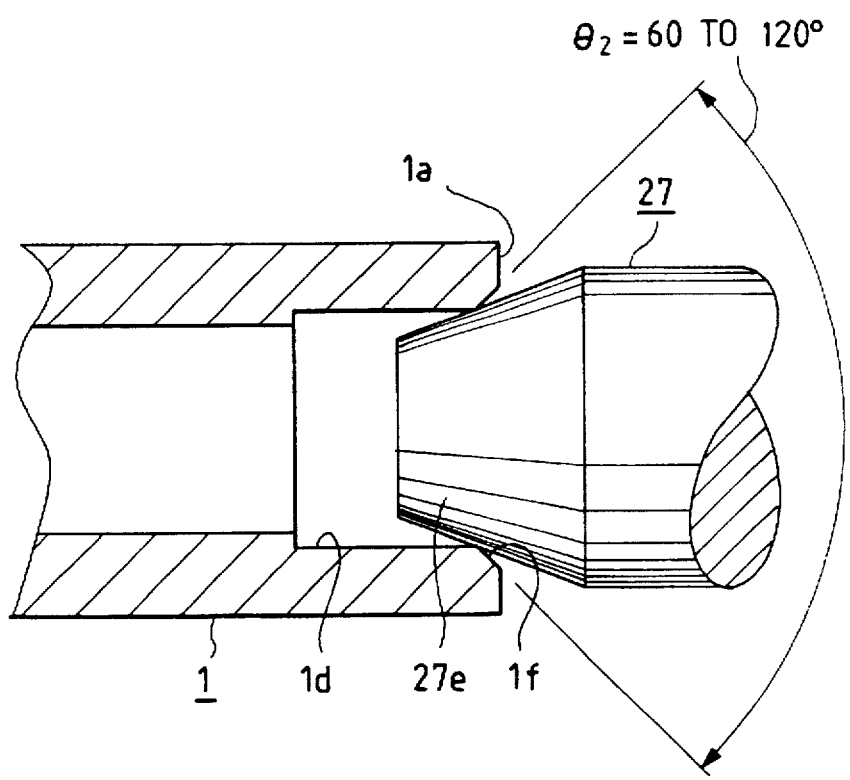

If the cut amount of the cylindrical surface of the work 1 is large or if the cylindrical surface is cut at a high speed, the cutting force Fn increases and this requires the pressing force P to increase. If the pressing force P increases, however, the circular ridge portion of the work 1 plastically deforms as described above, and this may produce a very large assembly error when the cylindrical member as a product is assembled to other parts. If this is the case, as shown in FIGS. 2A and 2B, the inner edges of the end faces 1a and 1b of the work 1 are chamfered, and the clamp portions 27e and 28e of the right and the left work holders 27 and 28 are abutted against the circular ridge portions formed between chamfers 1e and 1f, and the end faces 1a and 1b, respectively. Alternatively, as illustrated in FIGS. 3A and 3B, the clamp portions 27e and 28e of the right and the left work holders 27 and 28 are abutted against the circular ridge portions formed between the chamfers 1e and 1f and the large inner diameter portions 1c and 1d, respectively.

Figure 4A:
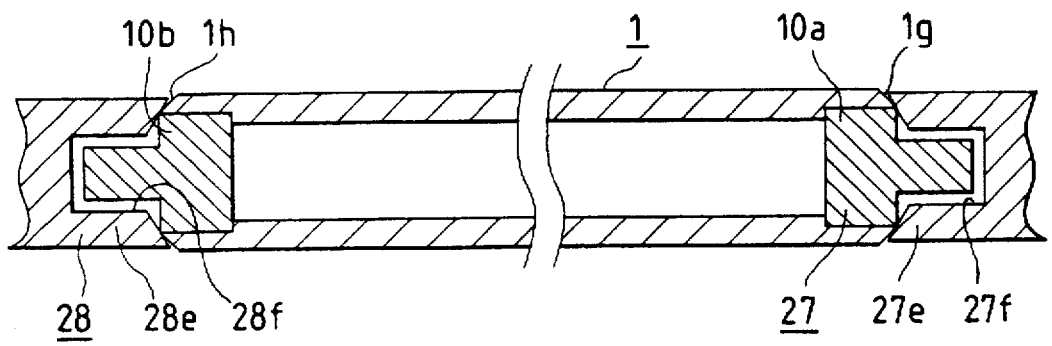
FIGS. 4A and 4B are views for explaining still another modification.
Figure 4B:
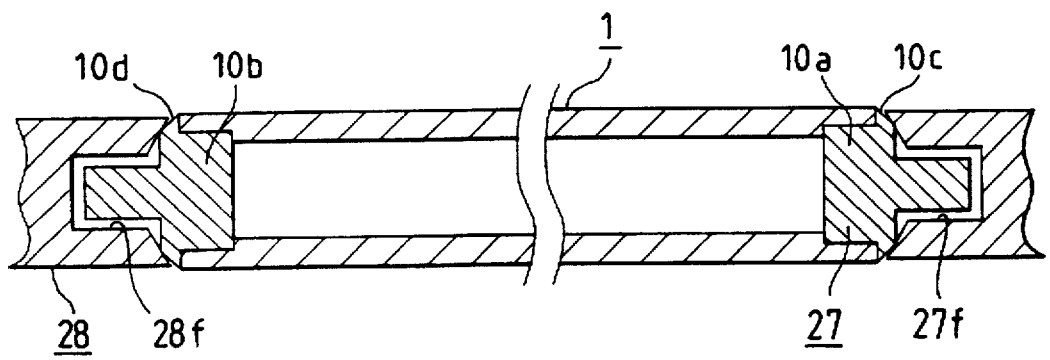

Also, as shown in FIGS. 4A and 4B, when the cylindrical surface of the work 1 is cut after flange members 10a and 10b are attached to the two ends of the work 1, depressions 27f and 28f for receiving projections of the flange members 10a and 10b are formed in the clamp portions 27e and 28e of the right and the left work holders 27 and 28, and the end faces of these depressions are tapered. As shown in FIG. 4A, the outer edges of the two end faces 1a and 1b of the work 1 are chamfered, and the tapered surfaces of the clamp portions 27e and 28e of the right and the left work holders 27 and 28 are abutted against the circular ridge portions formed on the inner edges of chamfers 1g and 1h, respectively. Alternatively, as illustrated in FIG. 4B, the outer edges of the flange members 10a and 10b are chamfered, and the tapered surfaces of the clamp portions 27e and 28e of the right and the left work holders 27 and 28 are abutted against the circular ridge portions formed on the inner edges of chamfers 10c and 10d, respectively.

It is desirable that a taper angle $\theta_1$ of the clamp portions 27e and 28e of the work holders 27 and 28 be set at 30° to 120° when the work 1 is not chamfered as in FIG. 1A. If the taper angle is less than 30°, the diameter of the holder decreases and this weakens the holding force intensity. If the taper angle is larger than 120°, it becomes difficult to perform the aligning action with respect to the work. When the work 1 is chamfered as shown in FIGS. 2A to 3B, a chamfer angle $\theta_2$ is set to 60° to 120°. When the clamp portions 27e and 28e of the work holders 27 and 28 are abutted against the inner edges of the chamfers as shown in FIGS. 2A and 2B, the taper angle $\theta_1$ is set to ($\theta_2$+30°) to 60°. When the clamp portions 27e and 28e of the work holders 27 and 28 are abutted against the outer edges of the chamfers as shown in FIGS. 3A and 3B, the taper angle $\theta_1$ is set to ($\theta_2$−30°) to 60°. When the flange portions 10a and 10b are chamfered as illustrated in FIGS. 4A and 4B, the chamfer angle $\theta_2$ is set to 60° to 120°, and the taper angle $\theta_1$ of the clamp portions 27e and 28e of the work holders 27 and 28 is set to ($\theta_2$+30°) to 60°.

In this embodiment, the clamp portions 27e and 28e of the right and the left work holders 27 and 28 are abutted against the circular ridge portions in the two ends of the work 1, and the work 1 is held by the pressing force acting in the axial direction. Therefore, if the circular ridge portions are formed coaxially with the central axis of the work 1, the work 1 can be set coaxially with an axis of rotation O of the cutting tools 24 and 25 of the cutting apparatus M by aligning the clamp portions 27e and 28e of the right and the left work holders 27 and 28 with the axis of rotation O of the cutting apparatus M.

By processing the circular ridge portions in the two ends of the work with a high accuracy, the work 1 is not bent even if the sections of the large inner diameter portions 1c and 1d of the work 1 are more or less nonuniform in wall thickness. Accordingly, the processing cost of the work 1 is lower than when the whole large inner diameter portions 1c and 1d of the work 1 are processed with a high accuracy. Also, only the circular ridge portions of the work 1 are brought into contact with the right and the left work holders 27 and 28, and the clamp portions 27e and 28e linearly contact these ridge portions. Therefore, contamination or wear on the surfaces of these clamp portions 27e and 28 does not immediately induce a bend of the work 1. This results in a low maintenance cost.

Furthermore, the cost of the cutting apparatus M is also low because the mechanism of the right and the left work holders 27 and 28 is simple and the shape of the clamp portions 27e and 28e is also simple.

That is, the cylindrical surface of the work can be finished to have an extremely high shape accuracy (a straightness and a roundness) without increasing the manufacturing cost of the work, the maintenance cost of the work holders, and the installation cost of the cutting apparatus. This greatly reduces the manufacturing cost of the cylindrical member such as a developing sleeve or a photosensitive drum base.

The steps of cutting the cylindrical surface of the work 1 by using the cutting apparatus M will be described below.

Figure 5A:
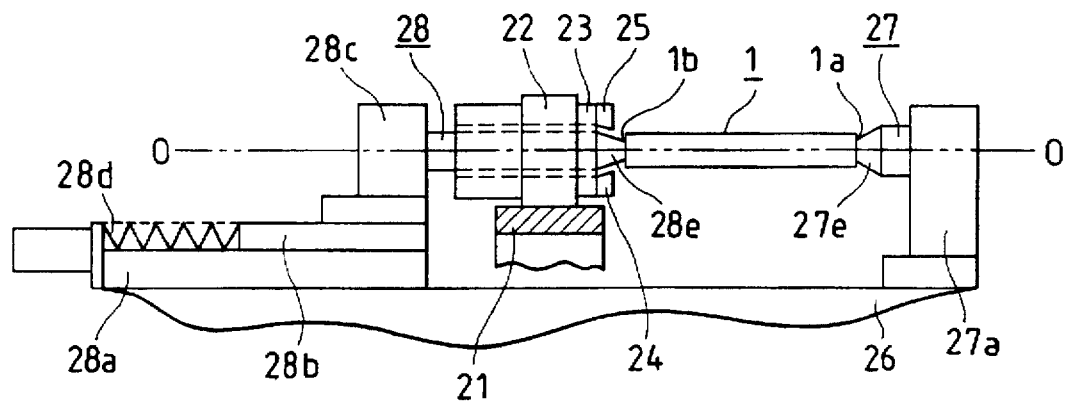
FIGS. 5A and 5B are views for explaining the step of cutting the work by using the cutting apparatus shown in FIGS. 1A and 1B.
Figure 5B:
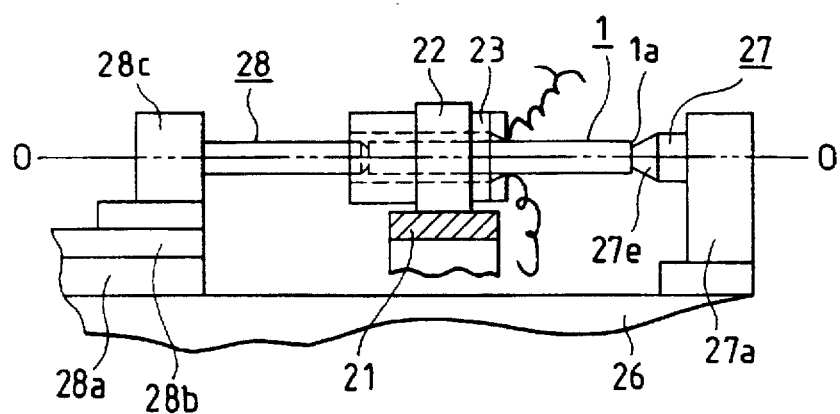

As shown in FIG. 5A, after the table 26 is moved to the right side of the table support 21b, the work 1 is loaded between the left and the right work holders 28 and 27. The right end of the work 1 is abutted against the clamp portion 27e of the right work holder 27, and a constant-pressure driving mechanism is driven to move the slider 28b. Consequently, the clamp portion 28e of the left work holder 28 comes close to and is abutted against the work 1 by the predetermined pressing force P, thereby holding the work 1 by the pressing force. During this step, the cutting tools 24 and 25 are kept rotated without being stopped from the preceding cutting cycle. Subsequently, as illustrated in FIG. 5B, the table 26 is moved to the left to continuously cut the cylindrical surface of the work 1 by the cutting tools 24 and 25. When the work 1 is completely cut over the full length, the table 26 is stopped and the slider 28b is moved backward to the left. As a consequence, the work 1 whose cylindrical surface is completely cut is released and unloaded from the machine.

Note that, as shown in FIG. 6, the two cutting tools 24 and 25 are disposed on the diameter crossing the axis of rotation O, and the depth of cut can be adjusted by moving these tools back and forth with respect to the axis of rotation O.

Figure 7A:
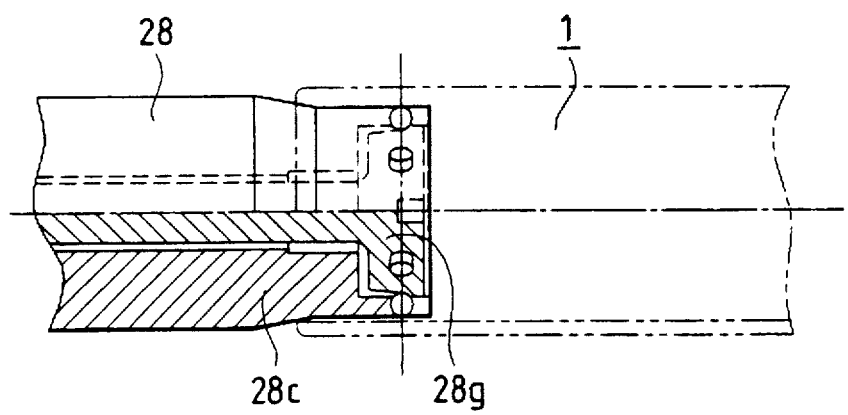
FIGS. 7A and 7B are views for explaining still another modification.
Figure 7B:
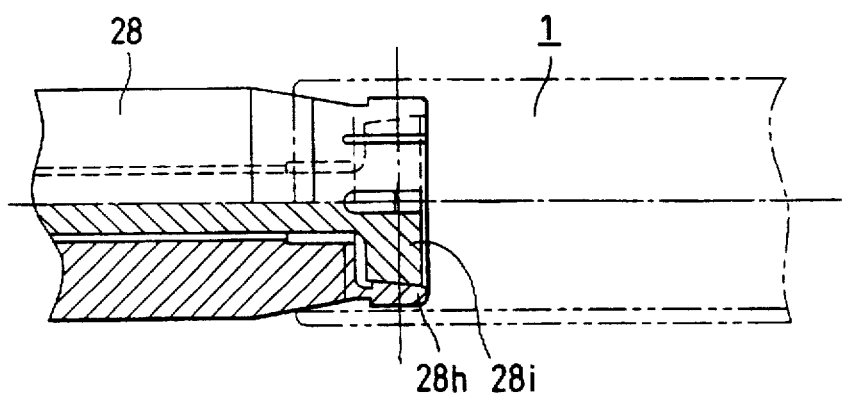

After being completely cut, the work 1 may be dropped when the pressing force P is released by moving the left work holder 28 backward. To prevent this, as shown in FIG. 7A, a hollow portion is formed in the left work holder 27, and a ball chuck 28g which is a well-known chuck that can freely protrude from the clamp portion 28e into the work 1 can be used. Alternatively, as illustrated in FIG. 7B, an elastic enlarging portion 28h which is an open collet type chuck integrated with the clamp portion 28e of the left work holder 28 may be formed and enlarged by a tapered piece 28i.

A cylindrical member having a high shape accuracy can be manufactured by using work holders similar to those used in this embodiment even when a general type lathe is used wherein the work, instead of a cutting tool, is rotated.

Figure 8A:
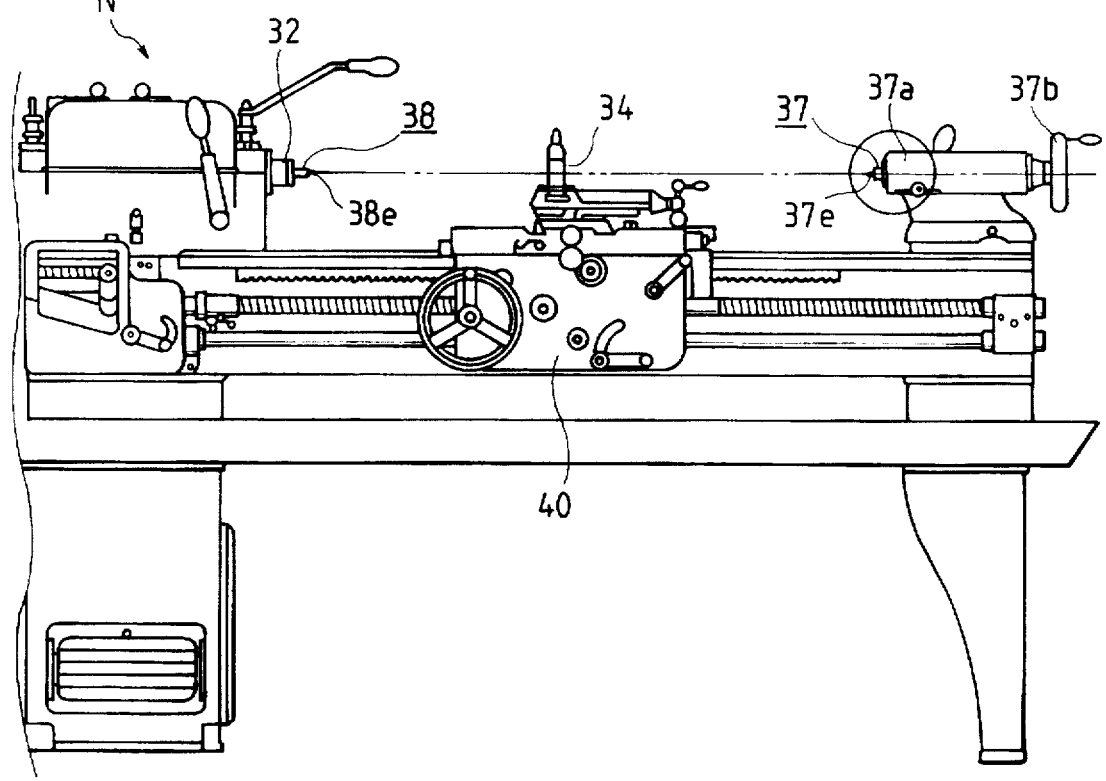

As shown in FIG. 8A, to form a tapered surface on a clamp portion 37e of a right work holder 37 which is supported on a driven spindle attached to a tailstock 37a of a well-known lathe N, the driven spindle is temporarily fixed so as not to rotate, and a cutting tool for cutting the clamp portion of the right work holder 37 is attached to a main spindle 32. The main spindle 32 is then rotated, and the tailstock 37a is moved in the direction of the main spindle 32, i.e., to the left in FIG. 8A. In this way, the clamp portion 37e of the right work holder 37 is tapered.

Subsequently, a left work holder 38 is attached to the main spindle 32 and rotated by rotating the main spindle 32. A cutting tool supported on a tool rest 34 is moved parallel to the spindle by a carriage 40 and at the same time moved in the cutting direction, thereby forming a tapered surface on a clamp portion 38e of the left work holder 38. By the above cutting, the tapered surfaces of the clamp portions 37e and 38e of the right and the left work holders 37 and 38 become perfectly coaxial with the center of rotation of the main spindle. In an experiment conducted by using a commercially available precision lathe, the degrees of alignment of the clamp portions 37e and 38e of the right and the left work holders 37 and 38 with respect to the main spindle showed good values, 2 µm or less. A work (not shown) is positioned between the right and the left work holders 37 and 38 such that it is precisely positioned, and the tailstock 37a is moved in the direction of the main spindle 32 to press the work from its right end in FIG. 8A. As a consequence, the work is held by the clamp portions 37e and 38e of the right and the left work holders 37 and 38.

Figure 8B:
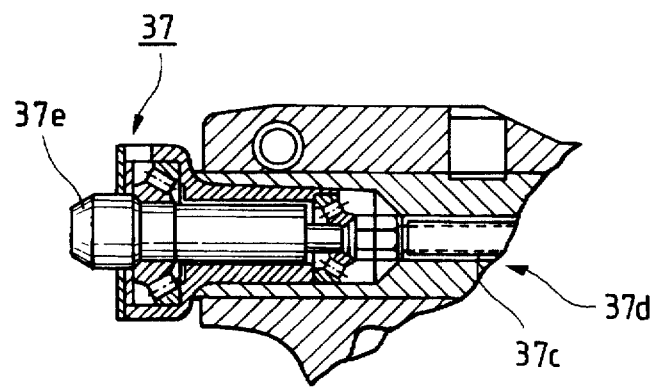

The pressing force at this time is set by the torque of a handle 37b for moving a tailstock spindle back and forth. Alternatively, as shown in FIG. 8B, a pressing force setting mechanism 37d having a compression spring 37c is provided in the right work holder 37. This allows an easy setting of the pressing force.

The set value of the pressing force is calculated on the basis of expression (4) presented earlier. An experiment was conducted in which an aluminum alloy material with an outer diameter of 12 mm, a wall thickness of 0.8 mm, and a total length of 250 mm was held by a pressing force of 4 kgf and the outer circumferential surface of the material was cut at a work rotation speed of 3,000 rpm, a feed amount per rotation of a cutting tool of 0.1 mm/rev, and a radial cutting amount of 60 µm. As a result, the work was stably held without being rotated by the cutting force, i.e., the rotation speeds of the main spindle and the work remained the same, and high-accuracy cutting was possible. Also, the deflection accuracy of the cylindrical surface of the cylindrical member was 10 µm or less, and the degrees of alignment between the large inner diameter portions in the two ends and the processed surface were 10 µm or less.

Figure 9:
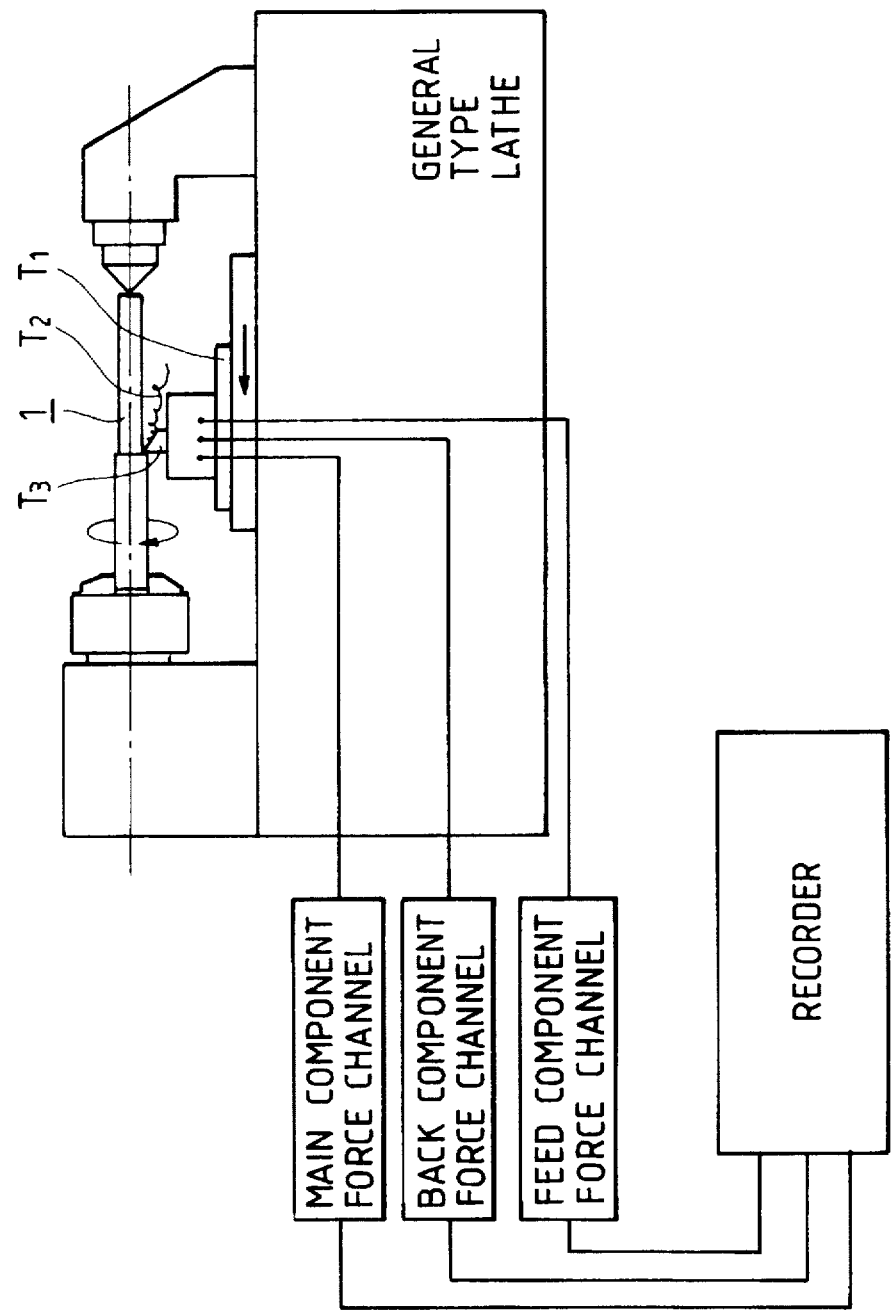
FIG. 9 is a view showing an apparatus for measuring the cutting force.

For reference, a method of measuring the cutting force Fn in expressions (1) to (4) will be described below. As shown in FIG. 9, in a general type lathe in which a work 1 is rotated, a cutting force meter $T_2$ capable of measuring three component forces of the cutting resistance (i.e., a force (main component force) Fn, as the cutting force acting on the work 1 in the direction of the tangent of the work 1, a force Ft (back component force) in the direction of the normal of the work 1) and a force Ff (feed component force) in the feed direction of the work 1, is arranged in a tool rest $T_1$ to which a cutting tool is attached, and a cutting tool $T_3$ is attached to the tool rest $T_1$.

The work 1 is rotated and cut under the same conditions as or conditions equivalent to actual cutting conditions, and the main component force Fn is measured. The equivalent conditions are that the cutting amount and the feed amount per revolution of a work are the same as in the actual cutting conditions. It is known that under the equivalent conditions the cutting resistance when a work is rotated is almost the same as when a cutting tool is rotated.

Figure 10A:
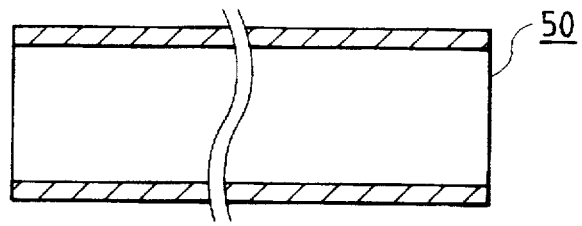
FIGS. 10A to 10E are views showing the steps in manufacturing a developing sleeve with a flange.
Figure 10B:
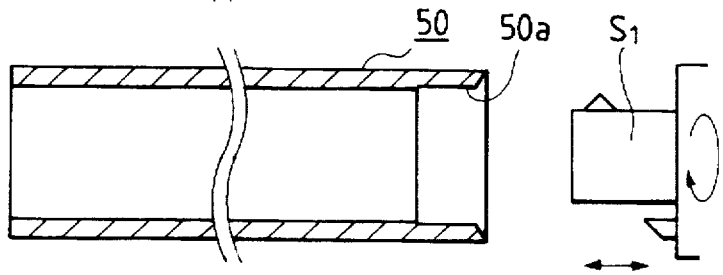
Figure 10C:
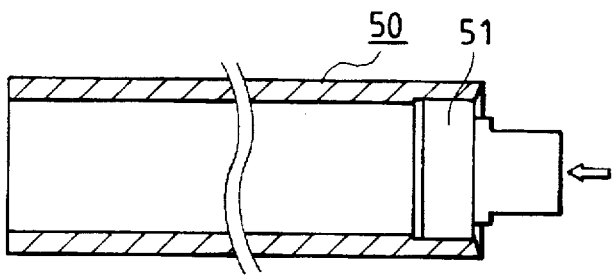
Figure 10D:
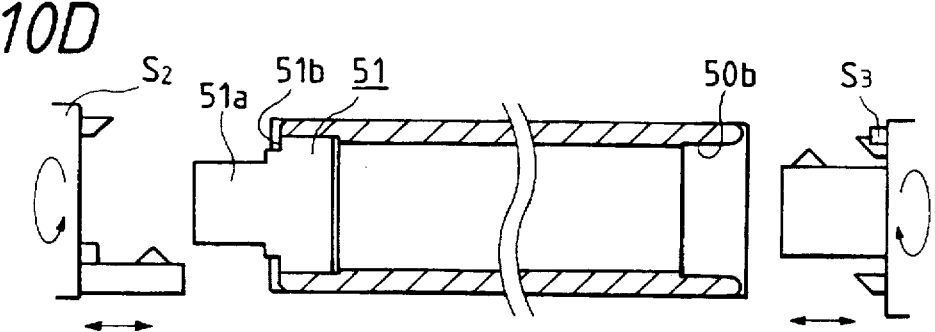
Figure 10E:
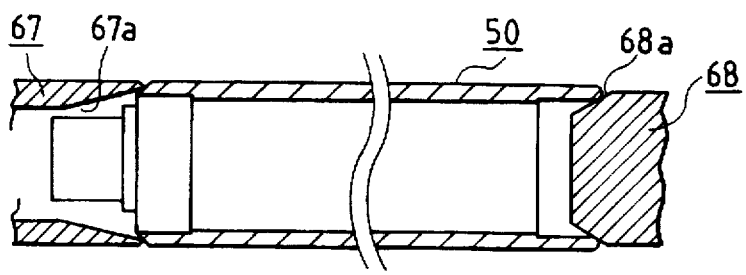
Figure 11A:
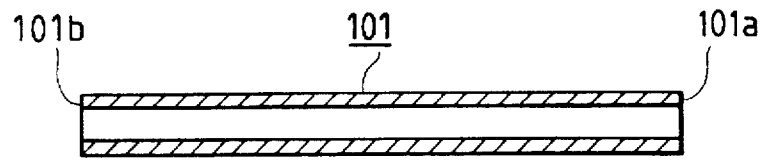
FIGS. 11A, 11B, and 11C are views for explaining one prior art.
Figure 11B:
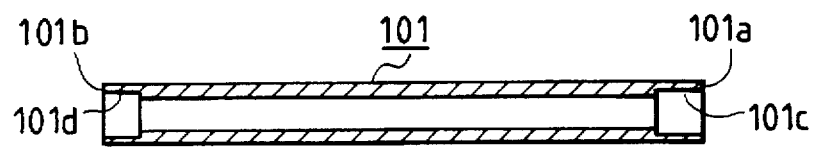
Figure 11C:
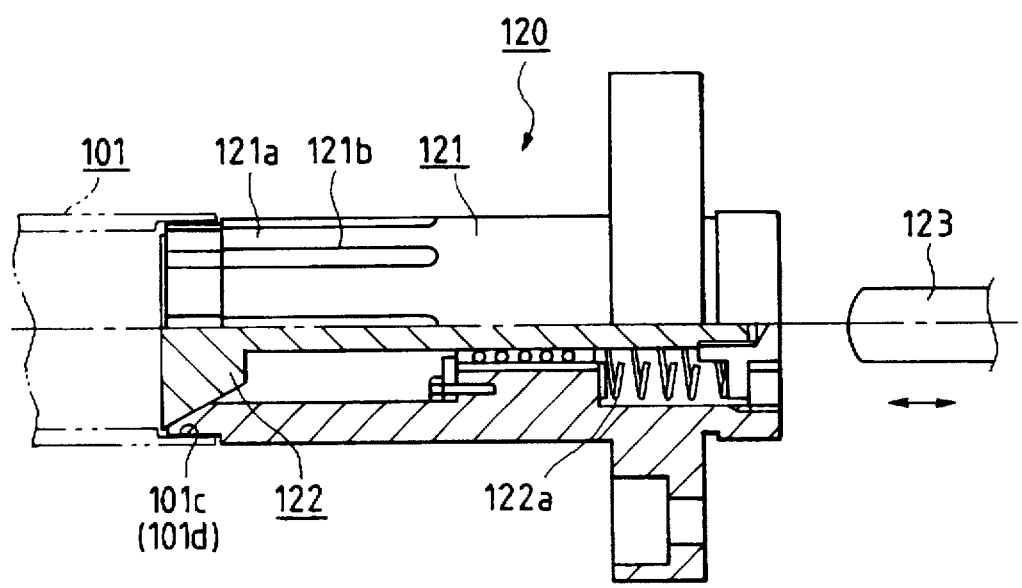
Figure 12A:
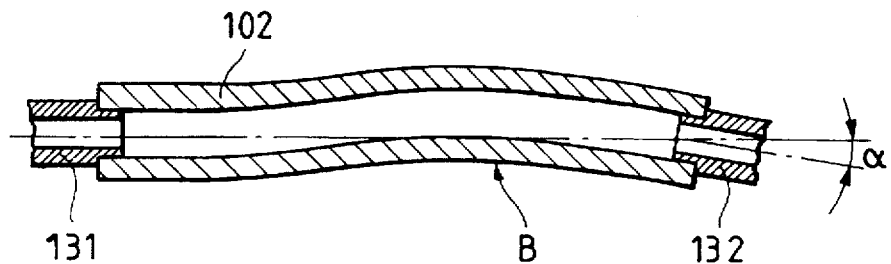
FIGS. 12A, 12B, and 12C are views for explaining a case where a work is bent in the prior art.
Figure 12B:
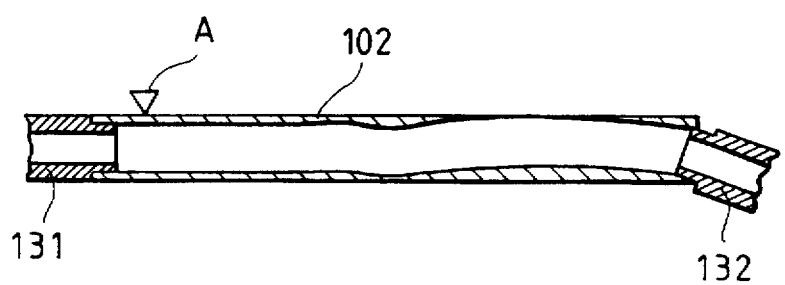
Figure 12C:
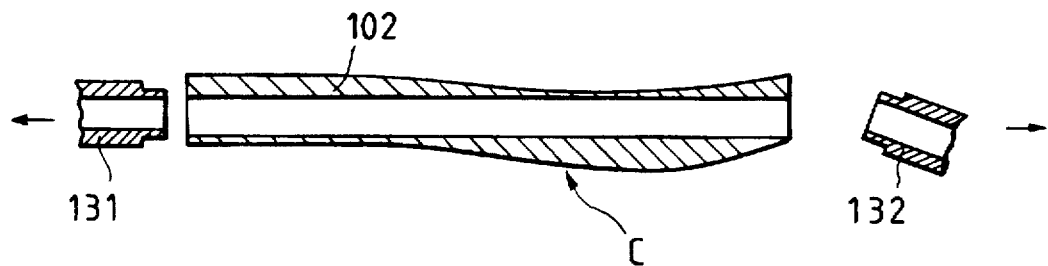

FIGS. 10A to 10E are views for explaining the steps in manufacturing a developing sleeve with a flange to be used in an image forming apparatus. A cylindrical work 50 is formed as shown in FIG. 10A, and primary end portion processing for press fit of a flange member is performed by using a first rotary tool $S_1$ (FIG. 10B). That is, a large inner diameter portion 50a into which a flange member 51 is pressed is processed, and the end portion of the large inner diameter portion 50a is chamfered. The flange member 51 is pressed into the work 50 thus processed (FIG. 10C), and secondary end portion processing is performed for the two ends of the work 50 by using second and third rotary tools $S_2$ and $S_3$ (FIG. 10D).

In this secondary end portion processing, the outer diameter of a shaft 51a of the flange member 51 and an end face 51b of the flange are finished and the outer circumferential portion of the work 50 is chamfered by using the second rotary tool $S_2$. Simultaneously, the large inner diameter portion 50b in the other end of the work 50 is processed and chamfered by using the third rotary tool $S_3$.

Work holders 67 and 68 having tapered clamp surfaces 67a and 68a are pressed against the two ends of the work 50 whose end portions are completely processed as described above, thereby holding the work 50 (FIG. 10E). The outer circumferential surface of the work 50 is cut to have a predetermined shape accuracy by rotary cutting tools rotating around the work 50.

The present invention has the above constructions and thereby achieves the following effects.

A cylindrical member including a cylindrical surface with a very high shape accuracy can be manufactured, Additionally, it is possible to decrease the installation cost and the maintenance cost of a cutting apparatus for finishing the cylindrical surface and the manufacturing cost of the work. This greatly reduces the manufacturing cost of the cylindrical member.

The use of this cylindrical member as a photosensitive drum base or a developing sleeve contributes to high performance and low cost of an image forming apparatus.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A processing method for a developing sleeve or a developing drum to be used for an image forming apparatus, comprising the steps of:

engaging a flange member having a shaft portion into an opened portion of a hollow cylindrical member;

forming a tapered portion on an outer periphery of the opened portion of the cylindrical member in which the flange member is engaged;

forming a tapered portion on a holding member for holding the cylindrical member;

holding the cylindrical member in a non-rotating condition by the tapered portion of the holding member; and processing an outer peripheral surface of the cylindrical member held in the non-rotating condition by a rotating process means.

2. A processing method for a developing sleeve or a developing drum to be used for an image forming apparatus, comprising the steps of:

forming a tapered portion on an outer periphery of an opened portion of a hollow cylindrical member;

forming a tapered portion on a holding member for holding the cylindrical member;

holding the cylindrical member in a non-rotating condition by the tapered portion of the holding member; and processing an outer periphery of the cylindrical member by a rotating process means.

3. A processing method for a developing sleeve or a developing drum to be used for an image forming apparatus, comprising the steps of:

inserting a cylindrical supplement member into a hollow cylindrical member to be tangentially and inwardly contacting with an opened portion thereof;

forming a tapered portion on an outer periphery of the opened portion of the cylindrical member into which the supplement member is inserted;

forming a tapered portion on a holding member for holding the cylindrical member;

holding the cylindrical member in a non-rotating condition by the tapered portion of the holding member;

processing an outer periphery of the cylindrical member by a rotating processing means; and removing the supplement member inserted into the cylindrical member after processing.

* * * * *

UNITED STATES PATENT AND TRADEMARK OFFICE
CERTIFICATE OF CORRECTION

PATENT NO. : 5,749,274
DATED : May 12, 1998
INVENTOR(S) : Chiba

It is certified that error appears in the above-identified patent and that said Letters Patent is hereby corrected as shown below:

On the title page, item [56],

FOREIGN PATENT DOCUMENTS, "2110570 4/1990 Japan" should read --2-110570 4/1990 Japan--.

COLUMN 8:

Line 45, "28" should read --28e--.

COLUMN 10:

Line 25, "work 1)" should read --work 1,--.
Line 26, "work 1," should read --work 1)--.

Signed and Sealed this

Twenty-ninth Day of June, 1999

Attest:

Q. TODD DICKINSON

Attesting Officer    Acting Commissioner of Patents and Trademarks